US006071368A

United States Patent [19]

Boyd et al.

[11] Patent Number: 6,071,368

[45] Date of Patent: Jun. 6, 2000

[54] METHOD AND APPARATUS FOR APPLYING A STABLE PRINTED IMAGE ONTO A FABRIC SUBSTRATE

[75] Inventors: Melissa D. Boyd; Mark H. Kowalski, both of Corvallis, Oreg.

[73] Assignee: Hewlett-Packard Co., Palo Alto, Calif.

[21] Appl. No.: 08/788,770

[22] Filed: Jan. 24, 1997

[51] Int. Cl.[7] .......................... B44C 1/165; B32B 31/00; B41M 3/12; B05D 1/28

[52] U.S. Cl. .......................... 156/240; 156/230; 156/247; 156/277; 156/289; 427/148; 427/428; 428/914

[58] Field of Search .................................... 156/230, 231, 156/238, 239, 240, 241, 247, 277, 289; 427/146, 148, 428; 428/914

[56] References Cited

U.S. PATENT DOCUMENTS

| | | |
|---|---|---|
| 3,306,867 | 2/1967 | Poplolek . |
| 4,294,641 | 10/1981 | Reed et al. . |
| 4,326,005 | 4/1982 | Reed et al. . |
| 4,329,698 | 5/1982 | Smith . |
| 4,455,147 | 6/1984 | Lewis et al. . |
| 4,500,895 | 2/1985 | Buck et al. . |
| 4,561,789 | 12/1985 | Saito et al. . |
| 4,664,670 | 5/1987 | Mehl et al. . |
| 4,732,815 | 3/1988 | Mizobuchi et al. . |
| 4,749,291 | 6/1988 | Kobayashi et al. . |
| 4,758,952 | 7/1988 | Harris, Jr. et al. . |
| 4,767,420 | 8/1988 | Mehl et al. . |
| 4,771,295 | 9/1988 | Baker et al. . |
| 4,773,953 | 9/1988 | Hare . |
| 4,794,409 | 12/1988 | Cowger et al. . |
| 4,844,770 | 7/1989 | Shiraishi et al. . |
| 4,929,969 | 5/1990 | Morris . |
| 4,963,189 | 10/1990 | Hindagolla . |
| 4,966,815 | 10/1990 | Hare . |
| 4,980,224 | 12/1990 | Hare . |
| 5,055,444 | 10/1991 | Kaszczuk . |
| 5,139,917 | 8/1992 | Hare . |
| 5,236,801 | 8/1993 | Hare . |
| 5,246,518 | 9/1993 | Hale . |
| 5,248,363 | 9/1993 | Hale . |
| 5,302,223 | 4/1994 | Hale . |
| 5,403,358 | 4/1995 | Aston et al. . |
| 5,431,501 | 7/1995 | Hale et al. . |
| 5,487,614 | 1/1996 | Hale . |
| 5,488,907 | 2/1996 | Xu et al. . |
| 5,766,398 | 6/1998 | Cahill et al. ............................ 156/240 |

FOREIGN PATENT DOCUMENTS

| | | |
|---|---|---|
| 0534660 | 9/1992 | European Pat. Off. . |
| 2189436 | 10/1987 | United Kingdom . |

OTHER PUBLICATIONS

*Hewlett–Packard Journal*, vol. 39, No. 4 (Aug. 1988).

*Primary Examiner*—Richard Crispino
*Assistant Examiner*—J. A. Lorengo

[57] ABSTRACT

An ink transfer sheet and method for using the same. The transfer sheet includes a backing layer, a release layer on the backing layer, and an ink receiving layer on the release layer. The ink receiving layer contains a quaternary ammonium salt thereon or impregnated therein. To use the transfer sheet, an ink containing an anionic coloring agent is applied to the ink receiving layer, preferably using thermal inkjet methods. Thereafter, the transfer sheet is positioned on a fabric substrate. Heat is applied to the sheet which causes the release layer and ink receiving layer to adhere to the substrate. The backing layer is then detached from the release layer leaving the release and ink receiving layers (with the printed image thereon) on the substrate. This process transfers the image to the fabric substrate, with the image being stabilized by interactions between the quaternary ammonium salt and anionic coloring agent.

11 Claims, 3 Drawing Sheets

METHOD AND APPARATUS FOR APPLYING A STABLE PRINTED IMAGE ONTO A FABRIC SUBSTRATE

BACKGROUND OF THE INVENTION

The present invention generally relates to the production of printed images on fabric substrates, and more particularly to a specially-treated ink transfer sheet which is used to thermally deliver ink materials to a fabric substrate in a manner which produces a vivid and stabilized (e.g. waterfast) printed image.

In recent years, the popularity of "personalized" printed clothing has greatly increased. For example, a variety of different techniques have been developed involving the production of custom-printed T-shirts and other clothing items. Of primary importance is the use of "transfer sheets" which contain monochrome (e.g. single color) or multi-colored printed images that are placed on a clothing item, followed by the application of heat thereto. As a result, the printed image on the sheet is "heat transferred" directly to the clothing item or other fabric substrate. This type of process along with representative ink transfer sheets and related procedures is discussed in a variety of references including U.S. Pat. Nos. 4,664,670; 4,758,952; 4,767,420; 4,980,224; 4,966,815; 5,139,917; and 5,236,801.

The basic ink transfer sheets of primary concern in the present case are commercially-available products which can be obtained from, for example, Foto-Wear, Inc. of Milford, Pa. (USA). These sheets normally involve three main layers, namely, (1) an inert backing layer which is ultimately removed and discarded; (2) a detachable release layer positioned on the backing layer which is designed for easy removal from the backing layer during the thermal transfer process; and (3) an ink receiving (e.g. ink absorbent) layer positioned on the release layer. In use, a printed image is initially applied to the ink receiving layer as discussed in greater detail below. Thereafter, the ink transfer sheet containing the printed image is positioned on a desired fabric substrate (e.g. a T-shirt or other clothing item) with the ink receiving layer (and printed image thereon) directly contacting the substrate. Heat is then applied by a conventional heated platen apparatus known in the art for thermal transfer purposes or a standard household iron in an amount sufficient to cause the release layer and accompanying ink receiving layer (containing the printed image) to adhere to the substrate. Because the release layer is typically produced from a low melting point polymeric composition, it softens substantially during the heating process which not only facilitates adhesion to the fabric substrate but also enables rapid detachment of the release layer from the backing layer. During or immediately after the application of heat to the ink transfer sheet on the fabric substrate, the backing layer is physically removed (e.g. peeled away) from the remaining layers of the transfer sheet. As a result, the release layer and attached ink receiving layer containing the printed image remain on the fabric substrate. In this manner, the printed image is effectively transferred to the substrate to generate a printed final product. It is important to note that the printed image (which is usually applied to the ink transfer sheet in a "reverse" configuration so that it will be properly oriented on the fabric substrate) is readily visible on the substrate since the release layer and ink receiving layer are substantially colorless (e.g. transparent). As a result, the printed image can be seen through these layers.

Heat-based ink transfer systems of the type described above have recently become available to consumers for in-home use. Consumers are now able to apply computer-generated or other images directly to a selected ink transfer sheet using commercially-available printing devices of conventional design. However, whether the printing process is being undertaken by consumers or on a large-scale commercial level, it is important that the printed image be stable or "waterfast" after it is applied to a selected fabric substrate. The term "waterfast" as used herein shall signify a printed image which does not smear, bleed, run, fade, or the like when exposed to moisture (e.g. water and/or water-based materials). If the printed image on the fabric substrate (e.g. T-shirt) is not sufficiently waterfast, it will progressively fade after repeated machine washings, thereby resulting in a product with a dull and indistinct character.

Prior to development of the present invention, a need existed for an effective thermal transfer process in which the resulting printed images remained clear, stable (e.g. waterfast), and fade-resistant over time. The present invention satisfies this goal through the use of a unique modified ink transfer sheet which includes chemical compositions that are capable of binding to charged coloring agents (e.g. dye molecules) in order to produce stabilized images. Likewise, the claimed invention is especially suitable for use in connection with thermal inkjet printing systems which enable the entire printing process to be accomplished by consumers at home. The claimed process and transfer sheets therefore represent an advance in the art of thermal transfer printing as discussed in greater detail below.

SUMMARY OF THE INVENTION

It is an object of the present invention to provide an improved ink transfer sheet and process for applying printed images to fabric substrates.

It is another object of the invention to provide an improved ink transfer sheet and process for applying printed images to fabric substrates which is suitable for use with many different printing systems.

It is another object of the invention to provide an improved ink transfer sheet and process for applying printed images to fabric substrates which is especially appropriate for use with inkjet printing systems (e.g. thermal inkjet units and other comparable systems).

It is another object of the invention to provide an improved ink transfer sheet and process for applying printed images to fabric substrates which uses a minimal number of process steps and materials to transfer the desired images.

It is a further object of the invention to provide an improved ink transfer sheet and process for applying printed images to fabric substrates in which the printed images are highly stable (e.g. waterfast) and fade resistant after repeated machine washings.

It is a further object of the invention to provide an improved ink transfer sheet and process for applying printed images to fabric substrates in which the printed images remain vivid and crisp after repeated machine washings.

It is a still further object of the invention to provide an improved ink transfer sheet and process for applying printed images to fabric substrates which is suitable for use in connection with a wide variety of different ink compositions and fabric substrates.

It is an even further object of the invention to provide an improved ink transfer sheet and process for applying printed images to fabric substrates which is readily applicable to both monochrome (e.g. single color) and multi-color printed images.

It is an even further object of the invention to provide an improved ink transfer sheet and process for applying printed images to fabric substrates which generally involves a minimal level of complexity and is suitable for use by both commercial users and consumers on an in-home basis.

In accordance with the present invention, a highly efficient method for applying clear, vivid, and stable printed images onto fabric substrate materials (e.g. T-shirts and other clothing items) is disclosed. The claimed ink transfer sheet and printing method enable the production of printed images using readily-available ink materials, with the resulting images being highly stable (e.g. waterfast) and fade-resistant even after multiple machine washing cycles. A brief summary of the present invention (e.g. the claimed ink transfer sheet and thermal transfer process) will now be provided, with a more in-depth discussion of these items being presented in the following Detailed Description of Preferred Embodiments section.

In accordance with the claimed invention, a unique ink transfer sheet and process for using the same are disclosed. To achieve the goals of the invention as discussed above, a specialized ink transfer sheet structure is initially provided. The transfer sheet is of multi-layer construction and includes a backing layer, a detachable release layer positioned on top of and adhered to the backing layer, and an ink receiving layer. The backing layer is primarily designed to provide support for the other layers in the transfer sheet while the release layer is used to adhere the ink receiving layer and printed image onto the fabric substrate. The ink receiving layer is specifically formulated to allow the adhesion and/or absorption of ink materials thereon so that a defined printed image can be effectively transferred. Further information regarding the various components and materials which can be used in connection with the multiple layers of the ink transfer sheet will be presented below.

In accordance with the claimed invention which represents a departure from the use of conventional transfer sheet structures, the ink receiving layer includes an additional ingredient which is specifically designed to produce an image-stabilizing effect and control waterfastness problems (e.g. fading) as previously discussed. Specifically, the ink receiving layer further includes at least one quaternary ammonium salt. The term "quaternary ammonium salt" as used herein shall be defined to involve a material which includes four separate groups (not necessarily the same) that are bonded to nitrogen in order to produce a positively-charged quaternary ammonium ion (a cation). At least one of these groups will be organic in character (e.g. will contain one or more carbon atoms). The positive charge of this cation is balanced by a selected anion. A quaternary ammonium salt produced in accordance with this general definition will have the following basic structural formula:

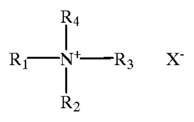

In this formula, $R_1$, $R_2$, $R_3$, and $R_4$ may be selected from a wide variety of organic groups including but not limited to aliphatic and/or aromatic groups which are substituted, non-substituted, branched, or non-branched as will be discussed in greater detail below. Likewise, in accordance with the definition provided above, $R_1$, $R_2$, $R_3$, and/or $R_4$ can consist of a hydrogen group (H), provided that at least one of $R_1$, $R_2$, $R_3$, and/or $R_4$ is organic (carbon-containing) in character. In addition, $X^-$ will consist of an anion (counterion) selected from a wide variety of anions which will likewise be described further below. Effective solutions containing quaternary ammonium salts which may be used to produce the claimed ink transfer sheet by direct application thereto will have a quaternary ammonium salt concentration level of about 0.5–15% by weight. While the present invention shall not be exclusively limited to any particular quaternary ammonium salt compositions, representative and preferred quaternary ammonium salt compounds suitable for use in the claimed ink transfer sheet include but are not limited to tricaprylyl methyl ammonium chloride, ditallow dimethyl ammonium chloride, tetraoctyl ammonium bromide, and tridodecyl ammonium chloride.

To produce the completed ink transfer sheet, an untreated transfer sheet structure is first provided which includes all of the layers listed above, namely, (1) the backing layer; (2) the release layer positioned on the backing layer; and (3) the ink receiving layer on the release layer. This basic structure is a commercially available product as discussed above. However, to manufacture the claimed ink transfer sheet (e.g. the treated sheet), the selected quaternary ammonium salt is delivered (preferably in the form of an aqueous solution) directly to the upper surface of the ink receiving layer of the sheet. Application of the quaternary ammonium salt may be accomplished in any conventional manner including the use of known spraying devices or other coating systems. In accordance with the present invention, the selected quaternary ammonium salt may ultimately reside directly on top of the ink receiving layer or instead may be entirely or partially impregnated (absorbed) within the ink receiving layer. Both of these variations shall be considered equivalent to each other in form and function. The extent to which the quaternary ammonium salt will penetrate the ink receiving layer will depend on a variety of factors including the type and porosity of the materials used to manufacture the ink receiving layer as determined by preliminary pilot testing. While the claimed invention shall not be strictly limited to any particular amount of quaternary ammonium salt on the ink transfer sheet, a sufficient amount of quaternary ammonium salt will be employed in a preferred embodiment to achieve an average dry salt concentration of about 2–10 g of quaternary ammonium salt per square meter ($m^2$) of the finished (treated) ink transfer sheet.

After production of the treated ink transfer sheet, the sheet may be used to transfer a desired printed image (either monochrome [single-color] or multi-colored) onto a selected fabric substrate (e.g. a T-shirt) in a stable, crisp, and waterfast manner. To achieve this goal, a prepared ink transfer sheet of the type described above is initially provided which again includes at least one quaternary ammonium salt as an active ingredient. Thereafter, an ink composition is also provided which contains at least one anionic (e.g. negatively-charged) coloring agent and an ink vehicle. The present invention shall not be restricted to any particular coloring agents and ink vehicles, with a wide variety of different chemical compositions being suitable for these purposes as specifically discussed in the following Detailed Description of Preferred Embodiments section. However, for the purposes of this invention, the term "anionic coloring agent" shall be defined to encompass selected dye compositions having at least one functional chemical group which is negatively-charged and capable of reacting with the positively-charged quaternary ammonium salt in solution to produce a "complex" from the selected coloring agent. Exemplary dye/coloring agent compositions suitable for this purpose will generally include but not be limited to carboxylated and/or sulfonated dye materials known in the art, with specific examples again being provided below. Furthermore, the term "coloring agent" may also encompass colorant/pigment dispersions known in the art which are made using dispersants that also include at least one functional chemical group which is capable of reacting with quaternary ammonium ions in solution to yield a complex. In a preferred embodiment, dispersants may be used which are carboxylated, sulfonated, or the like. Specific examples of color pigment dispersions which may be employed in the claimed process will be presented below.

After the desired ink composition containing at least one anionic coloring agent has been selected, it is thereafter delivered onto the ink receiving layer of the ink transfer sheet in order to form a printed image on the transfer sheet. Many different techniques may be used to accomplish ink delivery, although thermal inkjet printing methods are preferred and provide optimum results (e.g. a maximum level of clarity, simplicity, and high resolution). While thermal inkjet printing methods are of primarily interest, other inkjet systems may also be used to deliver the ink compositions of concern including piezoelectric inkjet printers, "continuous" inkjet devices, and the like. To accomplish ink delivery using thermal inkjet printing techniques, a thermal inkjet printing apparatus (printer unit) is initially provided which comprises at least one ink cartridge unit therein. The ink cartridge includes a housing and a printhead affixed to or within the housing. The printhead contains ink expulsion means for delivering ink materials from the ink cartridge, with typical ink expulsion means consisting of a plurality of thin-film resistor elements which, when electrified, heat the ink and selectively expel it from the cartridge as discussed further below. The housing of the ink cartridge further includes a supply of an ink composition therein which contains an ink vehicle and at least one anionic coloring agent as defined above. The supply of the ink composition is in fluid communication with the ink expulsion means associated with the printhead so that the printhead can selectively deliver the ink on-demand.

Delivery of the ink composition onto the ink receiving layer of the claimed ink transfer sheet is specifically accomplished in a thermal inkjet system by placing the ink transfer sheet directly within the thermal inkjet printing apparatus/printer. Thereafter, the ink expulsion means of the printhead associated with the ink cartridge is activated (e.g. energized) in order to deliver the ink composition from the ink cartridge onto the ink receiving layer of the transfer sheet to thereby form a clear and defined monochrome or multi-colored printed image on the sheet. However, as indicated above, the claimed invention shall not be exclusively limited to the use of thermal inkjet printing techniques, with other printing methods also being applicable.

Regardless of which ink delivery method is selected, once the ink composition is delivered to the ink receiving layer of the transfer sheet in a desired pattern, the anionic (e.g. negatively-charged) coloring agent in the ink composition will bind to the positively-charged quaternary ammonium salt in order to produce a chemical "complex" which is effectively fixed to the ink transfer sheet. This fixation process ultimately results in enhanced image stability on the fabric substrate which is characterized by improved waterfastness and reduced fading even after repeated machine washings.

Once the printed image has been applied to the ink receiving layer on the ink transfer sheet, the transfer sheet is placed on and against the selected fabric substrate so that the ink receiving layer (and the printed image) is in physical contact with the substrate. Many fabric materials may be used for this purpose including cotton, cotton blends, and synthetic compositions, with the present invention not being limited to any particular textile products for this purpose. Representative fabric materials which are particularly suitable for use in the claimed process will be discussed below. Thereafter, heat is applied to the ink transfer sheet while the transfer sheet is in direct contact with (positioned on) the fabric substrate. Heat is conventionally applied to the ink transfer sheet (e.g. using a standard heated platen apparatus or household iron) in an amount sufficient to cause the release layer and ink receiving layer associated therewith to soften and adhere to the fabric substrate. This is readily accomplished in accordance with the low melting point characteristics of the polymeric compounds which are typically used to manufacture the release layer. While the invention shall not be restricted to any particular temperature levels and processing times at this stage of the claimed method (which are typically determined by preliminary pilot studies), heating of the ink transfer sheet will preferably involve temperature levels of about 150–200° C. applied for approximately 0.3–3.0 minutes while the ink transfer sheet is in direct contact with the fabric substrate. Likewise, to ensure complete transfer of the printed image to the fabric substrate, it is preferred that pressure be applied to the transfer sheet positioned on the substrate during the application of heat in an amount sufficient to facilitate complete contact between the transfer sheet and the substrate. In a representative embodiment, this pressure would typically involve about 0.05–2.0 lbs/$in^2$ of the transfer sheet, although the exact pressure level to be used in a given situation may be determined in accordance with preliminary routine testing.

After or during the application of heat as discussed above, the backing layer is removed (e.g. by physical detachment or "peeling") from the ink transfer sheet in order to separate the release layer from the backing layer. As a result, the release layer and attached ink receiving layer (with the printed image thereon) are left on the fabric substrate. In this manner, the printed image is directly transferred to the substrate. It is important to note that the printed image (which is usually applied in a "reverse" configuration to the ink transfer sheet so that it will be properly oriented on the fabric substrate) is readily visible on the fabric substrate since both the release layer and ink receiving layer are substantially colorless (e.g. transparent). As previously indicated, the anionic (e.g. negatively-charged) coloring agent and the positively-charged quaternary ammonium salt interact to produce a precipitation/complexation reaction which stabilizes the printed image on both the ink transfer sheet and the fabric substrate. The printed image is vivid, crisp, and characterized by a high level of waterfastness (compared with ink transfer sheets that do not employ quaternary ammonium salts). As a result, the stabilized image avoids fading, color bleed, and a loss of image resolution even after repeated machine washings.

The present invention represents an advance in the art of thermal transfer printing on fabric substrates which provides numerous benefits and advantages including: (1) the rapid printing of clear, vivid, and distinct images with a minimal amount of equipment and process steps; (2) enhanced image waterfastness and fade-resistance; (3) a minimal level of complexity and required equipment which facilitates at-home use by consumers; (4) the ability to use thermal inkjet technology (or other inkjet systems) to generate high-resolution multi-color images which are characterized by improved stability levels; and (5) the ability to accomplish these goals using low-cost materials and equipment. These and other objects, features, and advantages of the invention will be discussed below in the following Brief Description of the Drawings and Detailed Description of Preferred Embodiments section.

DETAILED DESCRIPTION OF PREFERRED EMBODIMENTS

As indicated above, the present invention involves a unique and highly effective ink transfer sheet and method which enable the delivery of stable printed images to fabric substrates. The resulting images are effectively stabilized on the substrate and are characterized by a high level of waterfastness and a vivid appearance. In particular, the printed images are fade-resistant even after repeated machine washing cycles. These and other benefits of the present invention are accomplished through the use of a treated ink transfer sheet and specially-selected ink compositions (e.g. dyes/pigments) which interact to enhance image stability. It is likewise an important feature of the claimed invention that the initial printing of the image on the ink transfer sheet can be accomplished using thermal inkjet technology. This feature enables the entire thermal transfer process to be readily undertaken by consumers using conventional personal computer systems and printing equipment. However, while the present invention will be discussed herein with reference to inkjet technology (e.g. thermal inkjet systems), it shall not be limited to any particular printing system for image generation. Likewise, the claimed process and product shall not be exclusively restricted to any of the numerical parameters set forth below which represent preferred embodiments and are provided for example purposes.

A. THERMAL INKJET TECHNOLOGY

Before discussing the specialized ink transfer sheet and process of the claimed invention, a brief review of thermal inkjet technology and its applicability to the present case is in order. Thermal inkjet printing systems basically involve the use of an ink cartridge which includes at least one ink reservoir chamber in fluid communication with a substrate having a plurality of resistors thereon. Selective activation of the resistors causes thermal excitation of the ink and expulsion thereof from the ink cartridge. As noted above, representative thermal inkjet systems are discussed in U.S. Pat. No. 4,500,895 to Buck et al.; U.S. Pat. No. 4,794,409 to Cowger et al.; U.S. Pat. No. 4,509,062 to Low et al.; U.S. Pat. No. 4,929,969 to Morris; U.S. Pat. No. 4,771,295 to Baker et al.; and the *Hewlett-Packard Journal*, Vol. 39, No. 4 (August 1988).

Figure 1:
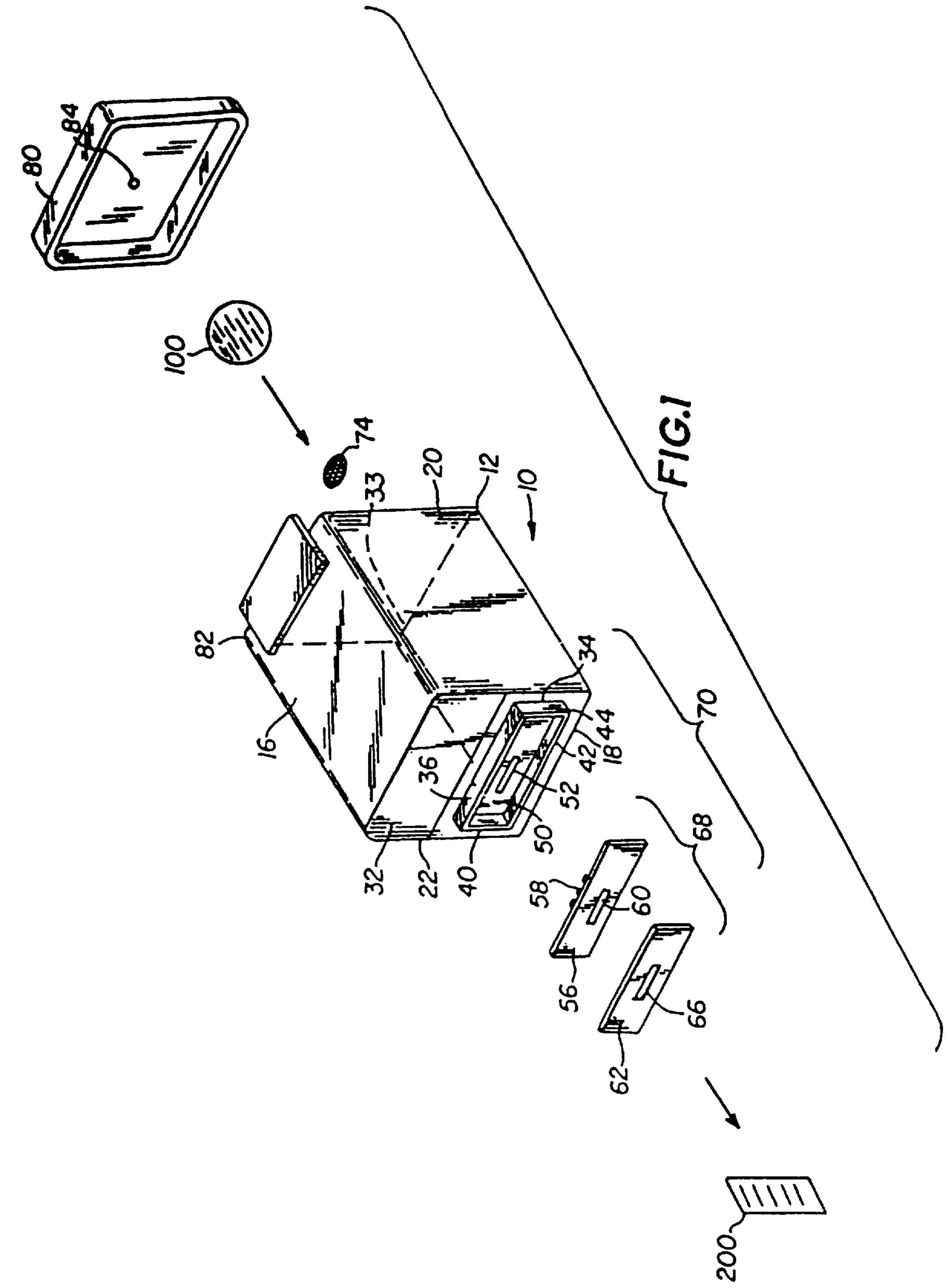
FIG. 1 is a schematic illustration of a representative thermal inkjet cartridge unit which is suitable for use in the process of the present invention.

In accordance with a preferred method for producing a printed image on the ink transfer sheet of the present invention (discussed below), a representative thermal inkjet cartridge 10 is schematically illustrated in FIG. 1. With reference to FIG. 1, the cartridge 10 consists of a housing 12 preferably of unitary (e.g. single-piece) construction and manufactured from plastic. The housing 12 further includes a top wall 16, a bottom wall 18, a first side wall 20, and a second side wall 22. In the embodiment of FIG. 1, the top wall 16 and the bottom wall 18 are substantially parallel to each other and of the same size. Likewise, the first side wall 20 and the second side wall 22 are substantially parallel to each other and of the same size.

With continued reference to FIG. 1, the housing 12 further includes a front wall 32. Surrounded by the front wall 32, top wall 16, bottom wall 18, first side wall 20, and second side wall 22 is an interior ink-retaining chamber or compartment 33 within the housing 12. The front wall 32 further includes an externally-positioned support structure 34 which is constructed of a plurality of outwardly-extending side sections 36, 40, 42, 44 with a substantially rectangular center zone 50 therebetween. Positioned within the center zone 50 and passing entirely through the front wall 32 of the housing 12 is an elongate ink outlet port 52 which communicates with the chamber 33 inside the housing 12.

Fixedly secured to the front wall 32 of the housing 12 (e.g. preferably using an adhesive composition known in the art) and positioned within the center zone 50 of the support structure 34 is a substrate in the form of a plate member 56 having a plurality of thin film resistors 58 thereon which are schematically illustrated and enlarged for the sake of clarity in FIG. 1. Likewise, the plate member 56 further includes at least one opening 60 therethrough which substantially registers and communicates with the ink outlet port 52 in the assembled cartridge 10. In addition, secured to the plate member 56 by adhesive, welding, or the like is an outer plate conventionally known as an "orifice plate" 62. The orifice plate 62 is preferably made of an inert metal composition (e.g. gold-plated nickel), and further includes at least one ink ejection orifice 66 therethrough. The ink ejection orifice 66 is arranged on the orifice plate 62 so that it substantially registers with the opening 60 through the plate member 56 in the assembled cartridge 10. For the purposes of this invention, plate member 56, thin film resistors 58, opening 60, orifice plate 62, and ink ejection orifice 66 shall collectively be characterized as "ink expulsion means" 68, the operation of which will be described below. Furthermore, as shown in FIG. 1, the ink expulsion means 68 in combination with the support structure 34 (e.g. including side sections 36, 40, 42, 44, center zone 50, and ink outlet port 52) shall collectively be characterized as the printhead 70 of the ink cartridge 10 which is fixedly secured to the cartridge 10.

As noted above, the claimed invention shall not be limited exclusively to the cartridge 10 shown in FIG. 1 or to thermal inkjet cartridges in general. For example, other cartridges/ink delivery systems may be encompassed within the present invention which involve printhead units having different ink expulsion means other than the thin film resistor assembly set forth above. Alternative ink expulsion means encompassed within the present invention shall include but not be limited to piezoelectric ink drop expulsion systems of the general type disclosed in U.S. Pat. No. 4,329,698 to Smith, dot matrix systems of the type disclosed in U.S. Pat. No. 4,749,291 to Kobayashi et al., as well as other comparable systems which are primarily concerned with the delivery of water-containing ink compositions.

With continued reference to FIG. 1, the ink cartridge 10 further includes an ink filter 74 which is mounted within the chamber 33 of the housing 12 as illustrated. Specifically, the ink filter 74 is mounted directly adjacent to and against the ink outlet port 52 in the front wall 32 of the housing 12. The ink filter 74 is preferably manufactured from stainless steel wire mesh.

As schematically illustrated in FIG. 1, the ink cartridge 10 also includes a cap member 80 which is adapted for affixation (e.g. using a conventional adhesive) to the open rear portion 82 of the housing 12. The cap member 80 likewise includes at least one air vent 84 which may be covered with a porous plastic membrane (not shown) as discussed in U.S. Pat. No. 4,771,295 to Baker et al. which allows air to pass therethrough while preventing ink leakage from the cartridge 10.

To deliver an ink composition to a selected substrate (e.g. made of fabric in this case) using the cartridge 10, the ink-retaining chamber 33 of the cartridge 10 is supplied with the claimed ink composition (schematically designated at reference number 100 in FIG. 1) which includes at least one anionic coloring agent, an ink vehicle, and a number of other ingredients, with all of these components being discussed in detail below. Thereafter, the ink cartridge is activated in order to apply the ink composition 100 from the chamber 33 to a selected substrate (which, in this case, involves an ink transfer sheet 200). The term "activation" as used herein basically involves a process in which the ink expulsion means 68 is directed by the printer unit (not shown in FIG. 1) to deliver ink from the chamber 33 to the selected substrate (e.g. ink transfer sheet). This is accomplished by selectively energizing the thin film resistors 58 on the plate member 56 (FIG. 1). As a result, ink positioned at the opening 60 in the plate member 56 is thermally excited and expelled outwardly through the ink ejection orifice 66 in the orifice plate 62 onto the substrate. In this manner, the cartridge 10 may be used to generate a printed image on the substrate. Further information concerning the thermal inkjet printing process is again set forth in the *Hewlett-Packard Journal*, Vol. 39, No. 4 (August 1988).

While the representative ink cartridge 10 illustrated in FIG. 1 is basically configured to produce monochromatic (e.g. single color images), multi-color ink cartridge units may likewise be employed. Accordingly, the present invention shall not be exclusively limited to any particular type of thermal inkjet delivery system, with many different systems being suitable for use. For example, representative commercially-available ink cartridge units which may be employed in connection with the claimed process can be obtained from the Hewlett-Packard Company of Palo Alto, Calif. (USA) under the following product designations/numbers: 51641A, 51645A, 51640C, 51640A, 51629A, and 51649A.

B. THE INK COMPOSITION TO BE EMPLOYED

Many different ink materials may be used in producing printed images on the ink transfer sheet and fabric substrate in accordance with the present invention. In this regard, the invention shall not be restricted to the generation of images using any particular ink product. However, at a minimum, the selected ink composition will include an ink vehicle and at least one coloring agent, with the term "coloring agent" being defined to encompass a wide variety of different dye materials and colors including black. Regarding the particular coloring agent to be employed, a preferred composition for this purpose will consist of an anionic coloring agent. The term "anionic coloring agent" involves a chemical coloring composition which is defined to include one or more negatively-charged groups. For example, representative and preferred negatively-charged functional groups typically associated with the anionic coloring agents of the present invention include but are not limited to —$COO^-$, —$SO_3^-$, —$CH_2COO^-$, $CH_2CH_2COO^-$, and others. Exemplary anionic materials suitable for use in the ink composition are listed in U.S. Pat. No. 4,963,189 to Hindagolla. Such materials are black and involve the following basic structure:

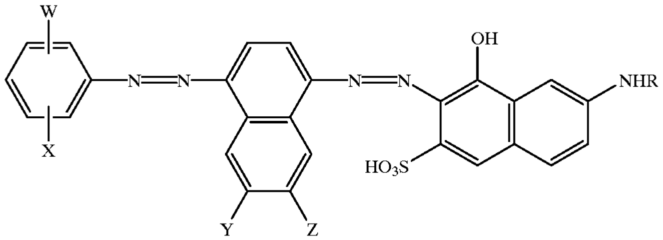

[W = —COOH
X = —H or —COOH
Y = —H, —COOH, or —$SO_3H$
Z = —H, —COOH, or —$SO_3H$
R = —H, —$CH_2COOH$, or —$CH_2CH_2COOH$]

Specific and exemplary dye structures are provided in Table I below:

TABLE I

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-CCOH | H | COOH | H |
| 4 | 3-COOH | 5-COOH | H | $SO_3H$ | H |
| 5 | 3-COOH | 5-COOH | $SO_3H$ | H | H |
| 6 | H | 4-COOH | H | COOH | H |
| 7 | 3-COOH | 4-COOH | H | H | $CH_2COOH$ |
| 8 | 2-COOH | 5-COOH | H | $SO_3H$ | $CH_2COOH$ |
| 9 | 3-COOH | 5-COOH | $SO_3H$ | H | $CH_2COOH$ |
| 10 | 3-COCH | 5-COOH | H | H | $CH_2CH_2COOH$ |
| 11 | 3-COOH | 5-COOH | H | COOH | $CH_2COOH$ |

Additional dye materials suitable for use in the invention as the anionic coloring agent are described in the *Color Index*, Vol. 4, 3rd ed., published by The Society of Dyers and Colourists, Yorkshire, England (1971), which is a standard text that is well known in the art. Exemplary dye materials listed in the *Color Index*, supra, which are appropriate for use herein include but are not limited to the following compositions: C.I. Direct Yellow 11, C.I. Direct Yellow 86, C.I. Direct Yellow 132, C.I. Direct Yellow 142, C.I. Direct Red 9, C.I. Direct Red 24, C.I. Direct Red 227, C.I. Direct Red 239, C.I. Direct Blue 9, C.I. Direct Blue 86, C.I. Direct Blue 189, C.I. Direct Blue 199, C.I. Direct Black 19, C.I. Direct Black 22, C.I. Direct Black 51, C.I. Direct Black 163, C.I. Direct Black 169, C.I. Acid Yellow 3, C.I. Acid Yellow 17, C.I. Acid Yellow 23, C.I. Acid Yellow 73, C.I. Acid Red 18, C.I. Acid Red 33, C.I. Acid Red 52, C.I. Acid Red 289, C.I. Acid Blue 9, C.I. Acid Blue 61:1, C.I. Acid Blue 72, C.I. Acid Black 1, C.I. Acid Black 2, C.I. Acid Black 194, C.I. Reactive Yellow 58, C.I. Reactive Yellow 162, C.I. Reactive Yellow 163, C.I. Reactive Red 21, C.I. Reactive Red 159, C.I. Reactive Red 180, C.I. Reactive Blue 79, C.I. Reactive Blue 216, C.I. Reactive Blue 227, C.I. Reactive Black 5, C.I. Reactive Black 31, and mixtures thereof. These materials are known in the art and commercially available from a variety of sources. Representative sources for dye materials of the type described above which may be used in the present invention include but are not limited to the Sandoz Corporation of East Hanover, N.J. (USA), Ciba-Geigy of Ardsley, N.Y. (USA) and others.

It should also be noted that the term "coloring agent" as used herein shall further encompass pigment dispersion materials known in the art which basically involve a water insoluble colorant (e.g. a pigment) which is rendered soluble through association with a dispersant (e.g. an acrylic dispersant).

Specific pigments which may be employed to produce pigment dispersion materials are known in the art, and the present invention shall not be restricted to any particular chemical compositions in this regard. Examples of such pigments include carbon black and the following compositions which are listed in the *Color Index*, supra: C.I. Pigment Black 7, C.I. Pigment Blue 15, C.I. Pigment Red 2, C.I. Pigment Red 122, C.I. Pigment Yellow 17, and C.I. Disperse Red 17. As noted above, dispersant materials suitable for combination with the foregoing pigments will include acrylic monomers and polymers known in the art. An exemplary commercial dispersant involves a product sold by W. R. Grace and Co. of Lexington, Mass. (USA) under the trademark DAXAD 30—30. However, as previously indicated, the claimed invention shall not be limited to the dyes and/or pigment dispersion materials listed above. Other chemically comparable materials may be employed which are determined by reasonable investigation to be suitable for the purposes set forth herein. In a preferred embodiment, the ink composition of the invention will include about 2–7% by weight total anionic coloring agent therein (e.g. whether a single coloring agent or combined coloring agents are used).

The ink composition will also include an ink "vehicle" which is essentially used as a carrier medium for the other components in the completed ink product. Many different materials may be employed as the ink vehicle, with the present invention not being limited to any particular compositions for this purpose. A preferred ink vehicle will consist of water, although other supplemental compositions in combination with water including 2-pyrrolidone, ethoxylated glycerol, diethylene glycol, 1,5-pentanediol, N-methyl pyrrolidone, 2-propanol, and 2-ethyl-2-hydroxymethyl-1,3-propanediol may be employed. All of these materials can be used in various combinations as determined by preliminary pilot studies involving the ink compositions of concern. However, in a preferred embodiment, the ink composition will include about 70–80% by weight total combined ink vehicle, wherein at least about 30% by weight or more of the total ink vehicle will involve water (with the balance consisting of any one of the above-listed supplemental compositions).

Next, the ink composition may include a number of optional ingredients in varying amounts. For example, an optional biocide may be added to prevent any microbial growth in the final ink product. Exemplary biocides suitable for this purpose would include proprietary products sold under the trademarks PROXEL GXL by Imperial Chemical Industries of Manchester, England; UCARCID 250 by Union Carbide of Danbury, Conn. (USA); and NUOSEPT 95 by Huls America, Inc. of Piscataway, N.J. (USA). In a preferred embodiment, if a biocide is used, the final ink composition will include about 0.05–0.5% by weight biocide, with about 0.30% by weight being preferred.

Another optional ingredient to be added to the ink composition will involve one or more buffering agents. The use of a selected buffering agent or multiple (combined) buffering agents is designed to stabilize the pH of the ink composition. In a preferred embodiment, the desired pH of the ink composition will range from about 4–9. Exemplary buffering agents suitable for this purpose will comprise sodium borate, boric acid, and phosphate buffering materials known in the art for pH control. The selection of any particular buffering agents and the amount of buffering agents to be used (as well the decision to use buffering agents in general) will be determined in accordance with preliminary pilot studies on the particular ink compositions of concern.

A still further optional ingredient which may be employed in the ink composition is an auxiliary bleed control agent. This material is especially appropriate for multi-color printing systems. Exemplary bleed control agents suitable for this purpose will involve magnesium nitrate, calcium nitrate, or mixtures of both. In a preferred embodiment, the ink composition will include about 3–6% by weight total auxiliary bleed control agent therein (if used). However, the selection of any given bleed control agent, the exact amount of bleed control agent to be added, and the general need for a bleed control agent may be determined in accordance with preliminary investigations involving the other components chosen for use in the ink composition. Additional ingredients (e.g. surfactants) may also be included in the ink composition if needed.

C. THE INK TRANSFER SHEET

Figure 2:
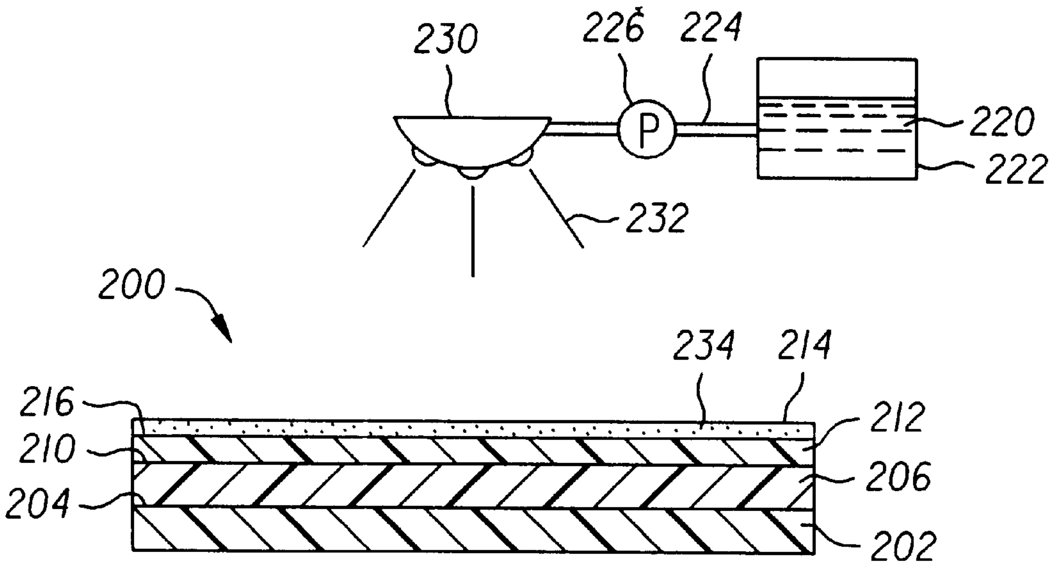
FIG. 2 is a cross-sectional schematic view of a representative multi-layer ink transfer sheet suitable for use in the claimed process, with the layers shown therein being enlarged for the sake of clarity.

In accordance with the invention, a specialized ink transfer sheet is provided which is designed to improve the overall stability (e.g. waterfastness) of printed images transferred to fabric substrates. While the claimed product and process shall not be exclusively restricted to any particular ink transfer sheet, a representative and preferred structure will consist of three basic layers as illustrated cross-sectionally and in an enlarged, schematic format in FIG. 2. The basic ink transfer sheet described below and illustrated in FIG. 2 (e.g. the 3-layer sheet structure excluding the unique additive discussed herein) is conventional in design and commercially available from, for example, Foto-Wear, Inc. of Milford, Pa. (USA). Likewise, ink transfer sheets of the same general type discussed above in connection with the ink transfer sheet 200 shown in FIG. 2 are generally described in U.S. Pat. Nos. 4,980,224 and 4,966,815. With reference to FIG. 2, a transfer sheet 200 is provided which first includes a backing layer 202. The backing layer 202 will typically have an average thickness of about 0.05–0.15 mm and may be produced from a wide variety of materials having a high degree of tear resistance and overall strength. Even though the claimed invention shall not be limited to any particular compositions in connection with the backing layer 202, representative materials suitable for this purpose include paper, polyester, cellophane, nylon, and various other plastic materials known in the art for this purpose (e.g. as discussed in U.S. Pat. No. 4,732,815).

Temporarily adhered to the upper surface 204 of the backing layer 202 is an intermediate or release layer 206 which entirely covers the backing layer 202. The release layer 206 will typically have an average thickness of about 0.01–0.06 mm and may likewise be produced from a wide variety of materials. However, low melting point polymeric compositions which typically melt at temperatures of about 100–180° C. or less are preferred in order to facilitate detachment of the release layer 206 from the backing layer 202 during the heat transfer process and to likewise enable proper adhesion of the release layer 206 to the selected fabric substrate. In this regard, representative materials suitable for producing the release layer 206 include but are not limited to polyethylene, polyester compositions, polyamides, and other similar polymers known in the art for this purpose as discussed in U.S. Pat. No. 4,294,641.

Finally, in the ink transfer sheet 200 shown in FIG. 2, an ink receiving layer 212 is provided on the upper surface 210 of the release layer 206. The ink receiving layer 212 is designed to receive and retain (e.g. absorb) ink compositions which are delivered to the ink transfer sheet 200 using the selected ink delivery system. In this regard, the ink receiving layer 212 should have sufficient ink absorptive capabilities to ensure proper adhesion of the ink to the ink transfer sheet 200, and to facilitate sufficient ink absorption on the sheet 200 so that a high level of print quality is maintained. In the preferred ink transfer sheet 200 shown in FIG. 2, the ink receiving layer 212 will have an average thickness of about 0.01–0.03 mm and may involve the use of many different chemical compositions for this purpose. However, in a representative and preferred embodiment, exemplary compositions which may be employed as the ink receiving layer 212 include but are not limited to various resin compositions (e.g. Singapore Dammar Resin as discussed in U.S. Pat. Nos. 4,980,224 and 4,966,815), polyvinyl pyrrolidone, polyvinyl alcohol, silica, and other compositions known in the art for this purpose.

It is important to emphasize at this point that both the release layer 206 and ink receiving layer 212 are substantially colorless (e.g. transparent) so that the printed image applied to the ink receiving layer 212 can be transferred (along with the release layer 206) to the fabric substrate and still be entirely visible through the layers 206, 212 as discussed below. Likewise, the claimed invention shall also not be limited to ink transfer sheets of any particular size, with the specific size of the selected sheet depending on many factors including the printing system being used to deliver ink materials to the sheet.

As previously noted, the basic 3-layer ink transfer sheet structure discussed above is conventional in design. However, the present invention involves a unique and important modification to this product wherein an additional ingredient is added which ultimately enables clear, vivid, and more stable (e.g. waterfast) printed images to be transferred to the desired fabric substrate. With continued reference to FIG. 2, the ink transfer sheet 200 of the present invention specifically includes at least one quaternary ammonium salt as an additional active ingredient on and/or within the ink receiving layer 212 of the ink transfer sheet 200. The quaternary ammonium salt is schematically represented at reference number 214 in FIG. 2. The term "quaternary ammonium salt" as used herein shall be defined to involve a material which includes four separate groups (not necessarily the same) that are bonded to nitrogen in order to yield a positively-charged quaternary ammonium ion (e.g. a cation). The positive charge of this cation is balanced by a selected negatively-charged anion. A quaternary ammonium salt as defined herein will have the following basic structural formula:

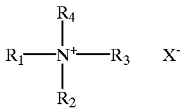

In the above formula, $R_1$, $R_2$, $R_3$, and $R_4$ may be selected from a wide variety of organic groups including but not limited to aliphatic and/or aromatic groups which are substituted, non-substituted, branched, or non-branched as described in greater detail below. In accordance with the definition provided above, $R_1$, $R_2$, $R_3$, and/or $R_4$ can also consist of a hydrogen group (H), provided that at least one of $R_1$, $R_2$, $R_3$, and/or $R_4$ is organic in character (e.g. carbon-containing). In addition, $X^-$ will consist of an anion selected from a wide variety of anions which will likewise be discussed further below. For example, in a preferred embodiment, the following representative $R_1$, $R_2$, $R_3$, and $R_4$ groups may be used as listed in the non-limiting Examples below:

EXAMPLE 1

$R_1$=—$C_nH_{2n+1}$; —$C_nH_{2n-1}$; —$C_nH_{2n-2}$; —$CH_2(C_6H_5)$; or H (wherein n is an integer≧10 and≦22).

$R_2$=$R_3$=$R_4$=—$C_nH_{2m+1}$; —$C_nH_{2m-1}$; —$C_nH_{2m-2}$ (wherein m is an integer≦8).

EXAMPLE 2

$R_1$=$R_2$=—$C_nH_{2n+1}$; —$C_nH_{2n-2}$; —$C_nH_{2n-2}$; —$CH_2(C_6H_5)$; or H (wherein n is an integer≧10 and≦22).

$R_3$=$R_4$=—$C_nH_{2m+1}$; —$C_nH_{2m-1}$; —$C_nH_{2m-2}$ (wherein m is an integer≦8).

EXAMPLE 3

$R_1$=$R_2$=$R_3$=$R_4$=—$C_nH_{2m+1}$; —$C_nH_{2m-1}$; —$C_nH_{2m-2}$ (wherein m is an integer≦8).

Once again, it should be noted that hydrogen (H), as well as a wide variety of organic constituents/groups (e.g. both alkyl, aryl, substituted alkyl, and substituted aryl) may be used in the present invention as $R_1$, $R_2$, $R_3$, and $R_4$ (provided that at least one of these groups is organic in character). Thus, the claimed process and product shall not be limited to any of the specific materials listed above, and instead shall cover the use of a quaternary ammonium salt as previously defined in its broadest sense. It is also contemplated that polymeric quaternary ammonium salt compositions may likewise be used.

In addition, $X^-$ shall involve an anion (counterion) which may be selected from a wide variety of different groups including but not limited to the following alternatives: $Cl^-$, $Br^-$, $I^-$, $PO_4^{-3}$, $SO_4^{-2}$, $CH_3SO_3^-$, $C_2H_5SO_3^-$, $CH_3COO^-$, or $C_2H_5COO^-$. Once again, the claimed invention shall not be restricted to the anions listed above, and it is contemplated that a wide variety of other suitable anions may also be used.

Salt solutions containing quaternary ammonium salts as described herein may be prepared by dissolving a given solid salt in an aqueous solution consisting primarily or entirely of water. Dissolution in this manner produces free quaternary ammonium ions ($R_1$, $R_2$, $R_3$, $R_4N^+$) which are available for reaction in accordance with the present invention as discussed below. Representative salts suitable for use in the claimed product and process (e.g. on or within the ink receiving layer 212 of the ink transfer sheet 200) include but are not limited to tricaprylyl methyl ammonium chloride, ditallow dimethyl ammonium chloride, tetraoctyl ammonium bromide, and tridodecyl ammonium chloride. The above-listed quaternary ammonium salts and other quaternary ammonium salts suitable for use herein are commercially available from a wide variety of sources including but not limited to Aldrich Chemical Company of Milwaukee, Wis. (USA), Fluka of Switzerland, Akzo of Dobbs Ferry, N.Y. (USA), and Polysciences of Warrington, Pa. (USA).

As previously stated, the quaternary ammonium salt solutions used in producing the ink transfer sheet 200 are typically prepared by dissolving solid quaternary ammonium salts in water. In a preferred embodiment, quaternary ammonium salt concentration levels of the resulting solutions should be about 0.5–15% by weight. Solutions having this salt concentration level are manufactured in accordance with conventional, known chemical practices. For example, to prepare a 10% by weight solution of tricaprylyl methyl ammonium chloride which is a preferred quaternary ammonium salt composition in this case, 10 g of salt would be added to 40 g of isopropanol and 50 g of water. Regarding the use of isopropanol, this material is preferably added to the solutions of quaternary ammonium salts which are employed to produce the claimed ink transfer sheets 200. This material functions as a solvent and, to achieve optimum results, solutions of quaternary ammonium salts prepared in accordance with the invention will include about 30–50% by weight isopropanol. However, the use of isopropanol may not be required in all cases, depending on the type of quaternary ammonium salt being used. In this regard, the addition of isopropanol in any given situation may be determined in accordance with routine preliminary tests on the specific solutions of interest. In addition, the quaternary ammonium salt solutions used in the present process may also contain an optional penetrant known in the art which decreases drying time if needed. Exemplary and preferred penetrants include but are not limited to butyl carbitol, butyl cellusolve, pentanol, and butanol. If used, it is preferred that the penetrant be added to the quaternary ammonium salt solutions so that the solutions comprise about 0.1–10% by weight penetrant.

With reference to FIG. 2, the selected quaternary ammonium salt solution may be applied (delivered) to the upper surface 216 of the ink receiving layer 212 on the ink transfer sheet 200 in many different ways, with the present invention not being limited to any particular application method. For example, a supply 220 of a selected quaternary ammonium salt solution of the type described above may be retained within a containment tank 222 that is operatively connected via tubular conduit 224 (having in-line pump 226 therein of a conventional fluid displacement variety) to a standard mist-type spraying apparatus 230. The supply 220 of the quaternary ammonium salt solution may then be delivered to the upper surface 216 of the ink receiving layer 212 in the form of a uniformly-distributed mist 232 schematically shown in FIG. 2. The selected quaternary ammonium salt solution may also be applied using conventional "draw down" techniques, as well as a standard roller or immersion apparatus. In addition, the quaternary ammonium salt solution may even be retained within one of the chambers in a multi-chamber thermal inkjet cartridge unit and thereafter delivered prior to or simultaneously with the delivery of the selected ink composition to an "untreated" ink transfer sheet structure containing all of the layers illustrated in FIG. 2.

Figure 3:
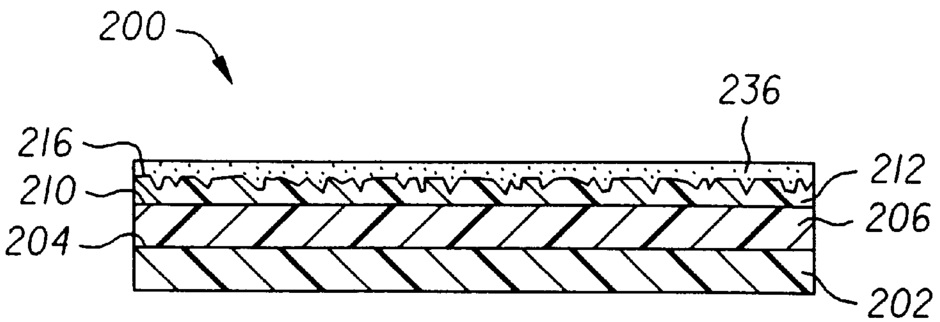
FIG. 3 is a cross-sectional schematic view of an alternative multi-layer ink transfer sheet suitable for use in the claimed process, with the layers shown therein being enlarged for the sake of clarity.

As indicated above, the ink receiving layer 212 of the completed ink transfer sheet 200 will comprise (e.g. contain) a selected quaternary ammonium salt of the type previously described. The term "comprise" as used herein shall involve a situation in which the quaternary ammonium salt resides in a discrete salt layer 234 (FIG. 2) on the upper surface 216 of the ink receiving layer 212 or is partially (or entirely) impregnated within the ink receiving layer 212. Both of these embodiments shall be deemed equivalent to each other in function and character. With reference to FIG. 3, an ink transfer sheet 200 of the same type as the sheet 200 illustrated in FIG. 2 is shown having the quaternary ammonium salt (designated at reference number 236 in FIG. 3) partially on the upper surface 216 of the ink receiving layer 212 and partially imbedded (e.g. impregnated) within the ink receiving layer 212. A number of different factors as determined by preliminary pilot experimentation will determine the extent of impregnation that will take place regarding the quaternary ammonium salt compositions. These factors include but are not limited to (1) the type and amount of quaternary ammonium salt solution being applied; (2) the chemical character (e.g. absorptivity and porosity) of the ink receiving layer 212; and (3) the application method used to apply the quaternary ammonium salt solution. It is also contemplated that the ink receiving layer 212 may be manufactured so that the chemical composition used to produce the layer 212 is initially combined (e.g. mixed/blended) with the selected quaternary ammonium salt solution prior to application of the ink receiving layer 212 to the release layer 206. In this manner, the ink receiving layer 212 will contain the desired quaternary ammonium salt composition therein when it is initially formed on the release layer 206. However, it is nonetheless preferred that the quaternary ammonium salt be applied directly to the upper surface 216 of the ink receiving layer 212 so that all of the upper surface 216 is completely coated/covered.

To achieve optimum results it is desired and preferred that the selected quaternary ammonium salt be applied to the ink transfer sheet 200 in an amount sufficient to achieve a dried quaternary ammonium salt content of about 2–10 g of total (combined) quaternary ammonium salt per square meter ($m^2$) of the ink transfer sheet 200. This is typically accomplished by applying about 1.0–6.0 ml of the desired quaternary ammonium salt solution having a concentration within the preferred range listed above (e.g. about 0.5–15% by weight quaternary ammonium salt) to the ink transfer sheet 200 per $m^2$ thereof. However, the exact amount of quaternary ammonium salt to be used in a given situation to achieve ideal results may be varied as needed and determined by preliminary pilot studies involving the specific ink materials (and anionic coloring agents) of interest. As discussed further below, the quaternary ammonium salt used in the claimed process and product provides important functional benefits. Specifically, the anionic coloring agent in the ink composition binds to the quaternary ammonium salt on the ink transfer sheet 200 in order to "fix" the ink composition to the transfer sheet 200 and ultimately produce a more vivid and stable (e.g. waterfast) printed image on the fabric substrate.

D. THE PRINTING PROCESS

A representative process for generating stable printed images on a fabric substrate using the materials discussed above will now be discussed. While many different inkjet and other printing systems may be employed to deliver the desired ink composition onto the ink transfer sheet 200, the present invention shall be primarily discussed in connection with the use of thermal inkjet technology. Again, the desired image may either be monochrome (e.g. black) or multi-colored depending on the desired character of the final image and the equipment being employed.

Figure 4:
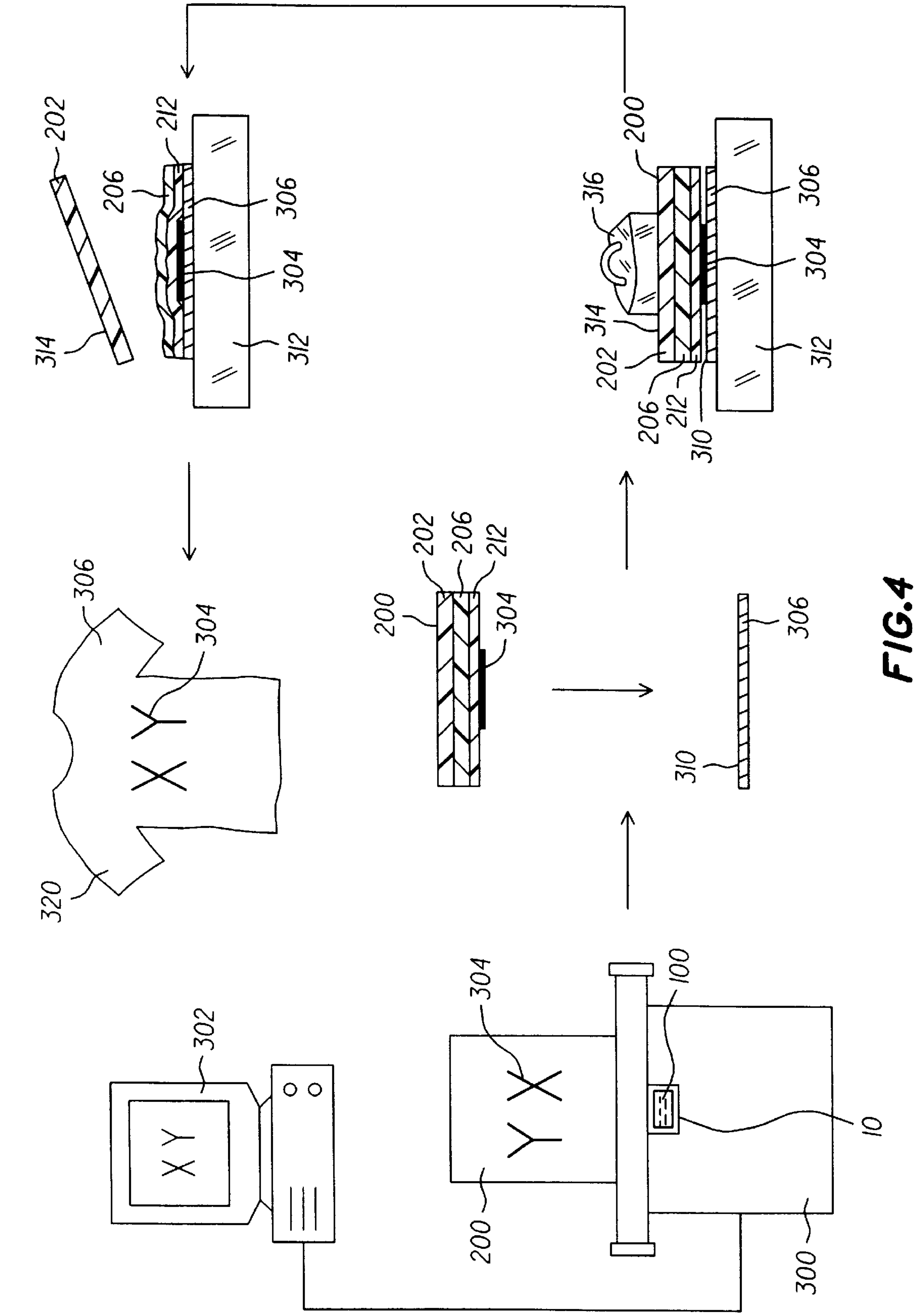
FIG. 4 is a sequential, schematic view of the steps which are used to transfer a printed image onto a fabric substrate using the materials and processes of the present invention.

With reference to FIG. 4, a thermal inkjet printing unit 300 is provided. Many different systems may be used in connection with the printing unit including printers manufactured by the Hewlett-Packard Company of Palo Alto, Calif. (USA) under the product designations DESKJET 400C, 500C, 540C, 560C, 660C, 682C, 693C, 820C, 850C, 870C, 1200C, and 1600C.

An ink cartridge unit (e.g. cartridge unit 10 illustrated in FIG. 1) is provided within the printing unit 300 which is supplied with the selected ink composition 100. As noted above, the ink composition contains at least one anionic coloring agent and an ink vehicle. Next, an ink transfer sheet 200 of the type previously discussed is provided and inserted (e.g. placed) into the printing unit 300 with the ink receiving layer 212 facing upwardly toward the ink cartridge 10. With continued reference to FIG. 4, the printing unit 300 is electrically connected to an image generating apparatus 302 which may involve many different systems selected from the group consisting of a personal computer (e.g. of the type manufactured by the Hewlett-Packard Company of Palo Alto Calif. (USA) under the trademark "PAVILION®"), a scanner unit (of the variety sold by the Hewlett-Packard Company of Palo Alto Calif. (USA) under the trademark "SCANJET®") or both. In this regard, the claimed process shall not be restricted to the use of any particular image generation device or protocol.

Next, the image generating apparatus 302 and the printing unit 300 are cooperatively activated in order to deliver a desired printed image onto the ink transfer sheet 200. Both the image generating apparatus 302 and the printing unit 300 are used to initiate the operation of the ink cartridge 10. The printing process is initiated by activation of the ink expulsion means 68 of the ink cartridge 10. In particular, the term "activation" shall again involve a process in which the ink expulsion means 68 of ink cartridge 10 is directed by the printing unit 300 to deliver ink from the chamber 33 to the ink transfer sheet 200. This is specifically accomplished in the present embodiment by selectively energizing the thin film resistors 58 on the plate member 56 of the cartridge 10 (FIG. 1). As a result, ink positioned at the opening 60 in the plate member 56 is thermally excited and expelled outwardly through the ink ejection orifice 66 in the orifice plate 62 onto the ink transfer sheet 200. In this manner, the cartridge 10 may be used to deliver a printed image 304 onto the ink transfer sheet 200 (FIG. 4) using the ink composition 100.

With continued reference to FIG. 4, the ink transfer sheet 200 is now ready to be used in the production of a printed fabric product. The transfer sheet 200 in FIG. 4 is schematically illustrated and, for the sake of clarity, only illustrates the backing layer 202, the release layer 206, the ink receiving layer 212, and the printed image 304. The quaternary ammonium salt 214 previously shown in FIGS. 2 and 3 is not illustrated in FIG. 4 since, at this point, it has formed an ink complex associated with the printed image 304. However, at the present time, it is important to emphasize the important functional capabilities of the quaternary ammonium salt and how it interacts with the ink composition 100 to yield a vivid and stable printed image 304. Prior to activation of the printing unit 300 as discussed above, the treated ink transfer sheet 200 will have quaternary ammonium salts thereon or impregnated therein. When liquid ink materials (e.g. the ink composition 100) are subsequently applied to the ink transfer sheet 200 (e.g. using thermal inkjet technology), they cause re-solvation of the salts, thereby producing free quaternary ammonium ions (e.g. $R_1$, $R_2$, $R_3$, $R_4N^+$). These ions are then able to interact with reactive functional groups (e.g. $—SO_3^-$ and/or $—COO^-$ groups) on the anionic coloring agent in the ink composition 100 so that waterfastness problems are controlled and image stability is achieved. Specifically, an insoluble coloring agent "complex" is formed on the ink transfer sheet 200 from the interaction which takes place between the anionic coloring agent in the ink composition 100 and the quaternary ammonium ions. This interaction is caused by the attraction between oppositely-charged species, namely, the positively-charged quaternary ammonium ions and the negatively-charged anionic coloring agents. As a result, a chemical "complex" is produced which is prevented from spreading, wicking, migrating, or otherwise bleeding beyond the initial ink droplet boundaries on the ink transfer sheet 200. This situation occurs because the rate of diffusion associated with the dye/colorant complex is much slower than the rate of diffusion involving uncomplexed coloring agents. As a result, a vivid and crisp printed image 304 is generated which is waterfast, does not color-bleed (e.g. in the case of multi-colored images), and is characterized by a consistent degree of quality even after multiple machine washings of the final printed fabric substrate as discussed below.

The complexation reaction described above occurs in a highly effective and unexpectedly efficient manner. While not completely understood, the binding/complexation reaction between quaternary ammonium ions and reactive groups (e.g. $—COO^-$ and/or $—SO_3^-$ groups) on the coloring agent molecules is schematically illustrated below. In the following example, $N^+$ represents a quaternary ammonium ion of the type described herein which is combined with a dye having $—COO^-$ and $—SO_3^-$ groups:

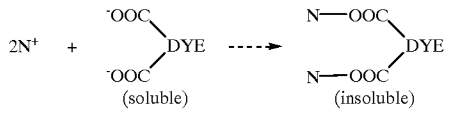

Next, the ink transfer sheet 200 with the printed image 304 thereon is removed from the printing unit 300. As illustrated schematically in FIG. 4, it is important to note that the printed image 304 is applied to the ink transfer sheet 200 in a "reverse" configuration so that it will be properly oriented on the final fabric substrate. A suitable fabric substrate 306 is then chosen. Many different items and materials may be used in connection with the fabric substrate 306 which shall not be limited to any particular textile materials/compositions. For example, the fabric substrate 306 may actually consist of a T-shirt or other conventional clothing item made from 100% cotton, 50—50 cotton/polyester blends, as well as other materials (e.g. rayon, wool, nylon, silk, and the like). To transfer the printed image 304 from the ink transfer sheet 200 to the upper surface 310 of the fabric substrate 306, the substrate 306 is first placed on a flat, hard support surface 312 (e.g. a table or other rigid item) and smoothed out so that no wrinkles are present. This may be accomplished by initially ironing or pressing the substrate 306 using a conventional iron/clothing press system which is well known in the art. Thereafter, the ink transfer sheet 200 with the printed image 304 thereon is positioned directly on the fabric substrate 306 so that the ink receiving layer 212 (and printed image 304) is in direct physical contact with the upper surface 310 of the fabric substrate 306.

Heat is then applied to the bottom surface 314 of the backing layer 202 using a conventional pressing/ironing apparatus 316 or other heated platen unit known in the art for thermal fabric transfer purposes. In a representative and preferred embodiment suitable for in-home use by consumers, a standard household iron may be employed for this purpose. During this step, a sufficient amount of heat is applied to the ink transfer sheet 200 to cause the release layer 206 and ink receiving layer 212 of the transfer sheet 200 to adhere to the upper surface 310 of the fabric substrate 306. In particular, the amount of heat applied to the ink transfer sheet 200 should be sufficient to (1) cause the low melting point polymeric materials used to form the release layer 206 of the ink transfer sheet 200 to soften and "flow" (along with the ink receiving layer 212 and printed image 304) onto the upper surface 310 of the fabric substrate 306; and (2) cause the release layer 206 to soften sufficiently to enable the detachment thereof from the backing layer 202 in a rapid and complete manner as discussed below. In a preferred embodiment using the materials and compositions recited above, these goals are accomplished by heating the ink transfer sheet 200 to a temperature of about 150–200° C. for about 0.3–3.0 minutes using the ironing/pressing apparatus 316. However, it many be necessary to vary these parameters depending on a wide variety of factors including the chemical content of the ink transfer sheet being employed and the type of fabric substrate being used as determined by preliminary testing. Likewise, to ensure complete transfer of the printed image 304 to the fabric substrate 306 during the application of heat as noted above, it is preferred that pressure be applied to the ink transfer sheet 200 positioned on the substrate 306 in an amount sufficient to facilitate complete contact between the transfer sheet 200 and the substrate 306. In a representative embodiment, this pressure would typically involve about 0.05–2.0 lbs/in$^2$ of the transfer sheet 200, although the exact pressure to be used in a given situation may be determined in accordance with preliminary routine testing.

After this step is completed and the ink transfer sheet 200 has been sufficiently heated, the backing layer 202 of the transfer sheet 200 is physically grasped and removed (e.g. peeled) from the other layers (the release layer 206 and the ink receiving layer 212 having the printed image 304 thereon) as illustrated schematically in FIG. 4. As a result, the backing layer 202 is separated from both the release layer 206 and attached ink receiving layer 212 which remain adhered to the upper surface 310 of the fabric substrate 306. This adhesion process basically occurs because the release layer 206 softens and flows around the individual fibers/microscopic surface irregularities of the fabric substrate 306 in order to mechanically bond to the surface of the substrate 306. The ink receiving layer 212 and printed image 304 thereon are then trapped against the substrate 306. In this manner, the printed image 304 is effectively transferred to the upper surface 310 of the fabric substrate 306. It is important to note that the printed image 304 (which is now oriented in its proper position) is readily visible on the fabric substrate 306 since both the release layer 206 and the ink receiving layer 212 are substantially colorless (e.g. transparent).

The resulting final printed product 320 is shown in FIG. 4. The printed image 304 on the product 320 is clear, vivid, and highly waterfast. The printed image 304 specifically resists fading, bleeding, and visual distortion after multiple machine washings compared with transfer processes that do not employ the quaternary ammonium salt-based system discussed above. Accordingly, the claimed invention represents an advance in the art of thermal fabric printing and provides many benefits including but not limited to (1) the rapid printing of clear, vivid, and distinct images with a minimal amount of equipment and process steps; (2) enhanced image waterfastness and fade-resistance; (3) a minimal level of complexity and required equipment which facilitates at-home use by consumers; (4) the ability to use thermal inkjet technology to generate high-resolution multi-color images which are characterized by improved stability levels; and (5) the ability to accomplish these goals using low-cost materials and equipment.

Having herein set forth preferred embodiments of the present invention, it is anticipated that suitable modifications may be made thereto by individuals skilled in the art which nonetheless remain within the scope of the invention. For example, the invention shall not be limited to any particular ink compositions, printing technologies, heating equipment, and material layers used to manufacture the ink transfer sheets. In this regard, the present invention shall only be construed in accordance with the following claims:

The invention that is claimed is:

1. A method for applying a stable printed image onto a fabric substrate comprising the steps of:

providing a multi-layer ink transfer sheet comprising a backing layer, a detachable release layer positioned on said backing layer, and an ink receiving layer positioned on said release layer, said ink receiving layer comprising at least one quaternary ammonium salt;

providing an ink composition comprising at least one anionic coloring agent and an ink vehicle;

delivering said ink composition onto said ink receiving layer of said ink transfer sheet in order to form a printed image on said ink transfer sheet, said anionic coloring agent in said ink composition binding to said quaternary ammonium salt in order to fix said coloring agent to said ink transfer sheet;

placing said ink transfer sheet on said fabric substrate so that said ink receiving layer of said ink transfer sheet is in contact with said fabric substrate;

applying heat to said ink transfer sheet while said ink transfer sheet is positioned on said fabric substrate in an amount sufficient to cause said release layer and said ink receiving layer thereon to adhere to said fabric substrate; and removing said backing layer from said ink transfer sheet in order to separate said release layer from said backing layer, said release layer and said ink receiving layer remaining adhered to said fabric substrate so that said printed image is transferred thereto.

2. The method of claim 1 wherein said quaternary ammonium salt is selected from the group consisting of tricaprylyl methyl ammonium chloride, ditallow dimethyl ammonium chloride, tetraoctyl ammonium bromide, and tridodecyl ammonium chloride.

3. The method of claim 1 wherein said applying of said heat to said ink transfer sheet comprises heating said ink transfer sheet to a temperature of about 150–200° C. while said ink transfer sheet is positioned on said fabric substrate.

4. The method of claim 1 wherein said ink transfer sheet comprises about 2–10 g of said quaternary ammonium salt per m$^2$ of said ink transfer sheet.

5. The method of claim 1 further comprising the step of applying pressure to said ink transfer sheet during said applying of said heat thereto in an amount sufficient to ensure complete contact between said ink transfer sheet and said fabric substrate.

6. The method of claim 5 wherein said pressure applied to said ink transfer sheet is about 0.05–2.0 lbs/in$^2$ of said transfer sheet.

7. A method for applying a stable printed image onto a fabric substrate comprising the steps of:

providing a multi-layer ink transfer sheet comprising a backing layer, a detachable release layer positioned on said backing layer, and an ink receiving layer positioned on said release layer, said ink receiving layer comprising at least one quaternary ammonium salt;

providing a thermal inkjet printing apparatus comprising at least one ink cartridge therein, said ink cartridge comprising a housing and a printhead, said printhead comprising ink expulsion means for delivering ink materials from said ink cartridge, said ink cartridge further comprising a supply of at least one ink composition within said housing, said supply of said ink composition being in fluid communication with said ink expulsion means of said printhead, said ink composition comprising at least one anionic coloring agent and an ink vehicle;

placing said ink transfer sheet within said thermal inkjet printing apparatus;

activating said ink expulsion means of said printhead in order to deliver said ink composition from said ink cartridge onto said ink receiving layer of said ink transfer sheet so that a printed image is formed on said ink transfer sheet, said anionic coloring agent in said ink composition binding to said quaternary ammonium salt in order to fix said coloring agent to said ink transfer sheet;

placing said ink transfer sheet on said fabric substrate so that said ink receiving layer of said ink transfer sheet is in contact with said fabric substrate;

applying heat to said ink transfer sheet while said ink transfer sheet is positioned on said fabric substrate in an amount sufficient to cause said release layer and said ink receiving layer thereon to adhere to said fabric substrate; and removing said backing layer from said ink transfer sheet in order to separate said release layer from said backing layer, said release layer and said ink receiving layer remaining adhered to said fabric substrate so that said printed image is transferred thereto.

8. The method of claim 7 wherein said quaternary ammonium salt is selected from the group consisting of tricaprylyl methyl ammonium chloride, ditallow dimethyl ammonium chloride, tetraoctyl ammonium bromide, and tridodecyl ammonium chloride.

9. The method of claim 7 wherein said applying of said heat to said ink transfer sheet comprises heating said ink transfer sheet to a temperature of about 150–200° C. while said ink transfer sheet is positioned on said fabric substrate.

10. The method of claim 7 wherein said ink transfer sheet comprises about 2–10 g of said quaternary ammonium salt per $m^2$ of said ink transfer sheet.

11. A method for applying a stable printed image onto a fabric substrate comprising the steps of:

providing a multi-layer ink transfer sheet comprising a backing layer, a detachable release layer positioned on said backing layer, and an ink receiving layer positioned on said release layer, said ink receiving layer comprising at least one quaternary ammonium salt selected from the group consisting of tricaprylyl methyl ammonium chloride, ditallow dimethyl ammonium chloride, tetraoctyl ammonium bromide, and tridodecyl ammonium chloride, said ink transfer sheet comprising about 2–10 g of said quaternary ammonium salt per $m^2$ of said ink transfer sheet;

providing a thermal inkjet printing apparatus comprising at least one ink cartridge therein, said ink cartridge comprising a housing and a printhead, said printhead comprising ink expulsion means for delivering ink materials from said ink cartridge, said ink cartridge further comprising a supply of at least one ink composition within said housing, said supply of said ink composition being in fluid communication with said ink expulsion means of said printhead, said ink composition comprising at least one anionic coloring agent and an ink vehicle;

placing said ink transfer sheet within said thermal inkjet printing apparatus;

activating said ink expulsion means of said printhead in order to deliver said ink composition from said ink cartridge onto said ink receiving layer of said ink transfer sheet so that a printed image is formed on said ink transfer sheet, said anionic coloring agent in said ink composition binding to said quaternary ammonium salt in order to fix said coloring agent to said ink transfer sheet;

placing said ink transfer sheet on said fabric substrate so that said ink receiving layer of said ink transfer sheet is in contact with said fabric substrate;

heating said ink transfer sheet to a temperature of about 150–200° C. while said ink transfer sheet is positioned on said fabric substrate in order to cause said release layer and said ink receiving layer thereon to adhere to said fabric substrate; and removing said backing layer from said ink transfer sheet in order to separate said release layer from said backing layer, said release layer and said ink receiving layer remaining adhered to said fabric substrate so that said printed image is transferred thereto.

* * * * *